United States Patent [19]
Simpson et al.

[11] Patent Number: 5,180,120
[45] Date of Patent: Jan. 19, 1993

[54] CONVERTIBLE AIRCRAFT SEAT

[76] Inventors: Leslie J. Simpson, 3 Deep Acres, Chesham Bois, Amersham, Great Britain; Brian S. Bayliss, "Jobec", Shiplake Bottom, Peppard, England

[21] Appl. No.: 663,878

[22] PCT Filed: Sep. 8, 1989

[86] PCT No.: PCT/GB89/01060
§ 371 Date: May 10, 1991
§ 102(e) Date: May 10, 1991

[87] PCT Pub. No.: WO90/02685
PCT Pub. Date: Mar. 22, 1990

[30] Foreign Application Priority Data
Sep. 8, 1988 [GB] United Kingdom ............... 8821066

[51] Int. Cl.⁵ .............................................. B64D 11/06
[52] U.S. Cl. .......................... 244/118.6; 244/122 R; 297/232
[58] Field of Search .............. 244/118.6, 122 R; 297/118, 180, 232, 257

[56] References Cited

U.S. PATENT DOCUMENTS

| | | | |
|---|---|---|---|
| 3,145,052 | 8/1964 | Morgan | 297/233 |
| 3,638,997 | 2/1972 | Shapiro | 297/232 |
| 3,743,351 | 7/1973 | Harris | 297/118 X |
| 3,893,729 | 7/1975 | Sherman | 297/118 |
| 4,533,175 | 8/1985 | Brennan | 297/232 |
| 4,881,702 | 11/1989 | Slettebak | 244/118.6 |

Primary Examiner—Galen Barefoot
Assistant Examiner—Christopher P. Ellis
Attorney, Agent, or Firm—Stanley J. Price, Jr.

[57] ABSTRACT

A main seat support frame includes slidable seat sections to allow the overall length of the seat and the number of sitting positions to be varied as required. The frame is provided with fixing positions for arm dividers which allow delimitation of a predetermined number of sitting positions when the seat is fully expanded corresponding to an economy class configuration and a fewer number of sitting positions of greater sitting width when the seat is contracted corresponding to a business class configuration. Since the width of the seat backs remains constant, bolsters may be attached to them when the seat is contracted for business class usage allowing for rapid conversion of the seating arrangement as between economy and business class usage.

9 Claims, 3 Drawing Sheets

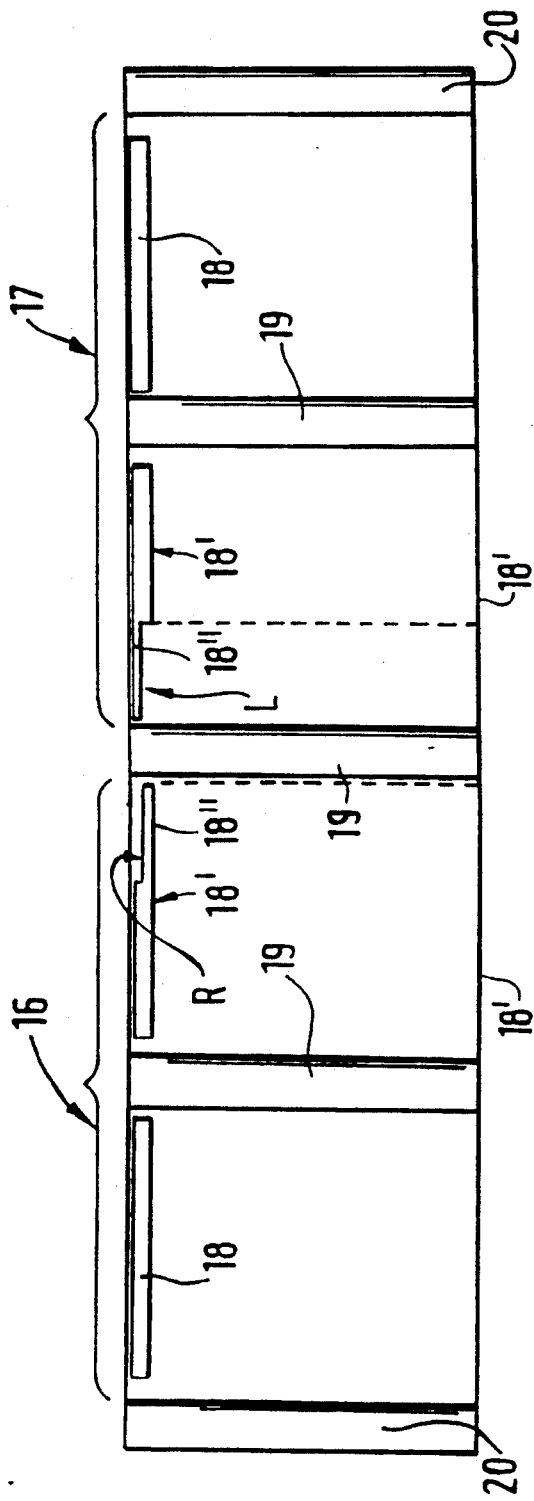
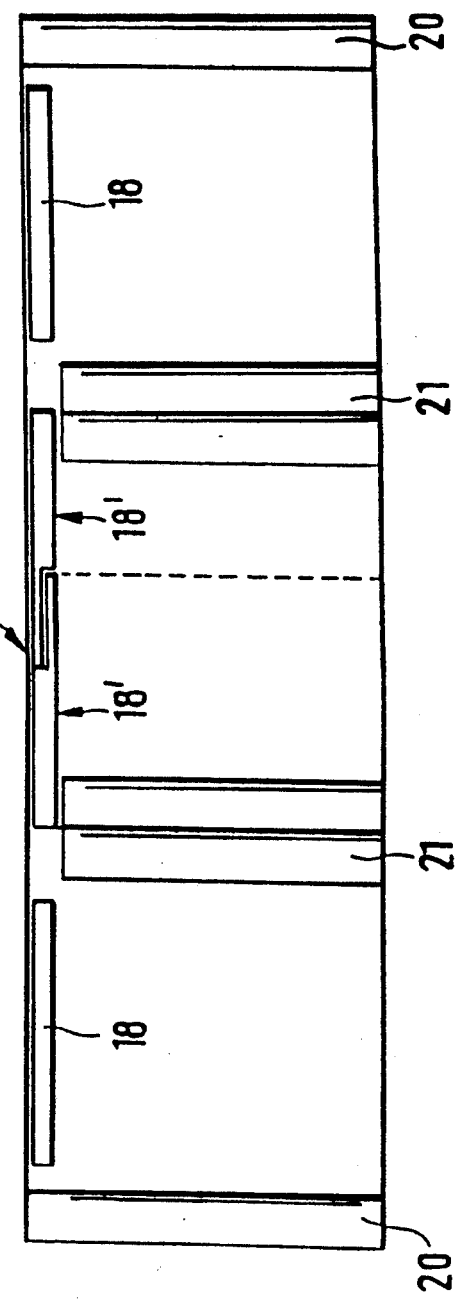
FIG.4a.
FIG.4b.

CONVERTIBLE AIRCRAFT SEAT

FIELD OF THE INVENTION

The present invention relates generally to seating and in particular to seating for use in aircraft.

BACKGROUND OF THE INVENTION

The airline business today is divided mainly into two catagories of carrier, namely the schedule carriers and charter operators.

Schedule carriers cater for three classes of passenger namely first class, business class and economy class and normally all three together in one aircraft or an alternative mixture of first class and economy class or business and economy class. In contrast charter operators offer single class accommodation and nothing else.

The present invention is concerned mainly with scheduled service operation and the problems of flexibility of use as between the differing class sections of the aircraft. However the invention is not limited thereto and may be applicable to seating used by any category of airline carrier.

In order to maximize profitability the scheduled airline operators arrange the seating in the aircraft cabin based on predicted load factors as between first, business and economy class passengers. The most important of these classes, as far as profitability is concerned, is business class.

Indeed, business class accommodation is recognized by all major carriers as the highest profit earner since it attracts the full fare and is used by those who travel more frequently than others. Hence when planning seating configuration for scheduled operation, airlines seek to maximize the potential for carrying business class passengers. Problems arise however due to the variability of demand. For example, on international flights high demand for business class seats occurs at the start and the end of the working week, with very little intermediate demand. Again low demand for business class seats is encountered during holiday periods, when the demand for economy seats is high.

Moreover, demand for the better class seats varies with route, so that on the New York to London run for example, it is very high, whereas the opposite applies for example on the London to Bombay route.

Although conceivably it would be possible to solve the problem by dedicating aircraft having a particular seating arrangement according to demand on any particular route, logistically this is unworkable.

An alternative possibility would be to increase the business class section of an aircraft to cater for a high demand period on a particular route. However logistics will determine that the same aircraft would have to be used on the same route when the demand for business class seats is low so that a considerable number of seats would remain unfilled with consequent loss of profitability.

The solution adopted by a number of airlines is to provide a medium sized business class section together with the installation of a movable divider. Thus the divider may be deployed when there is a low demand for business class such that some of the business class seats are joined to the economy class section, therefore to be used by passengers travelling on economy fares, which are normally less than half the fare of a business class passenger.

This is clearly unfair and leads to consumer ill feeling. This will be clearly apparent when a comparison is made between the facilities provided in a business class section and an economy section in two main types of aircraft, the B747 and DC10, as follows:

| Aircraft Type | Economy | Business |
| --- | --- | --- |
| B747 | 10 passengers across 3-4-3 32" of space | 6/7 passengers across 2-2-2 2-3-2 38" of space |
| DC10 | 9 passengers across 3-3-3 32" of space | 7 passengers across 2-3-2 38" of space |

A further disadvantage as regards profitability is the fact that business class passengers tend to migrate into the section aft of the divider because experience tells them that these seats are of the same quality as in the business class section itself. This reduces revenue.

To compensate for these problems there have been a number of convertible seat designs which change configurations from 3-3-3 to 2-2-2. One such design has been operated successfully by a major airline for a number of years but with the rapid advancement in business class seat development it has become too much of a compromise.

This design essentially provides a seat structure whereby the position of the arm dividers may be adjusted such that, for example, a three seater economy configuration may be converted to a two seater configuration by removing the two middle dividers and inserting a business class type arm divider intermediate the two outer arm supports of the seat.

However, the overall structural width of the seat is invariant and it has limited adaptability to other configurations. Moreover, its visual appearance is not good.

SUMMARY OF THE INVENTION

It is an object of the present invention to provide an aircraft seat which overcomes the disadvantages of known aircraft seating and provides the cabin flexibility currently demanded by the airline industry as regards use both for economy class passengers and business class passengers.

According to one aspect of the invention there is provided a convertible aircraft seat comprising a seat support frame for anchoring to the floor of an aircraft cabin, one or more seat sections slidable on the support frame for movement to positions on the frame whereby to vary the overall width of the seat and the number of sitting positions, retaining means for holding the or each seat sections in said positions, and divider means for attachment to said support frame at selected intervals corresponding to said number of sitting positions.

According to another aspect of the invention there is provided a convertible aircraft seat comprising a main seat section providing one or more passenger seats, one or more extendible seat sections attached to the main seat section, and means for guiding each extendible seat section for movement between an extended position to provide an extra seat and a retracted position as part of the main seat section.

The advantages of the invention will become apparent from the following description of a preferred embodiment presented with reference to the accompanying drawings.

BRIEF DESCRIPTION OF THE DRAWINGS

FIGS. 4a and 4b are plan views of another embodiment of a convertible aircraft seat according to the invention.

BEST MODES OF CARRYING OUT THE INVENTION

Figure 1:
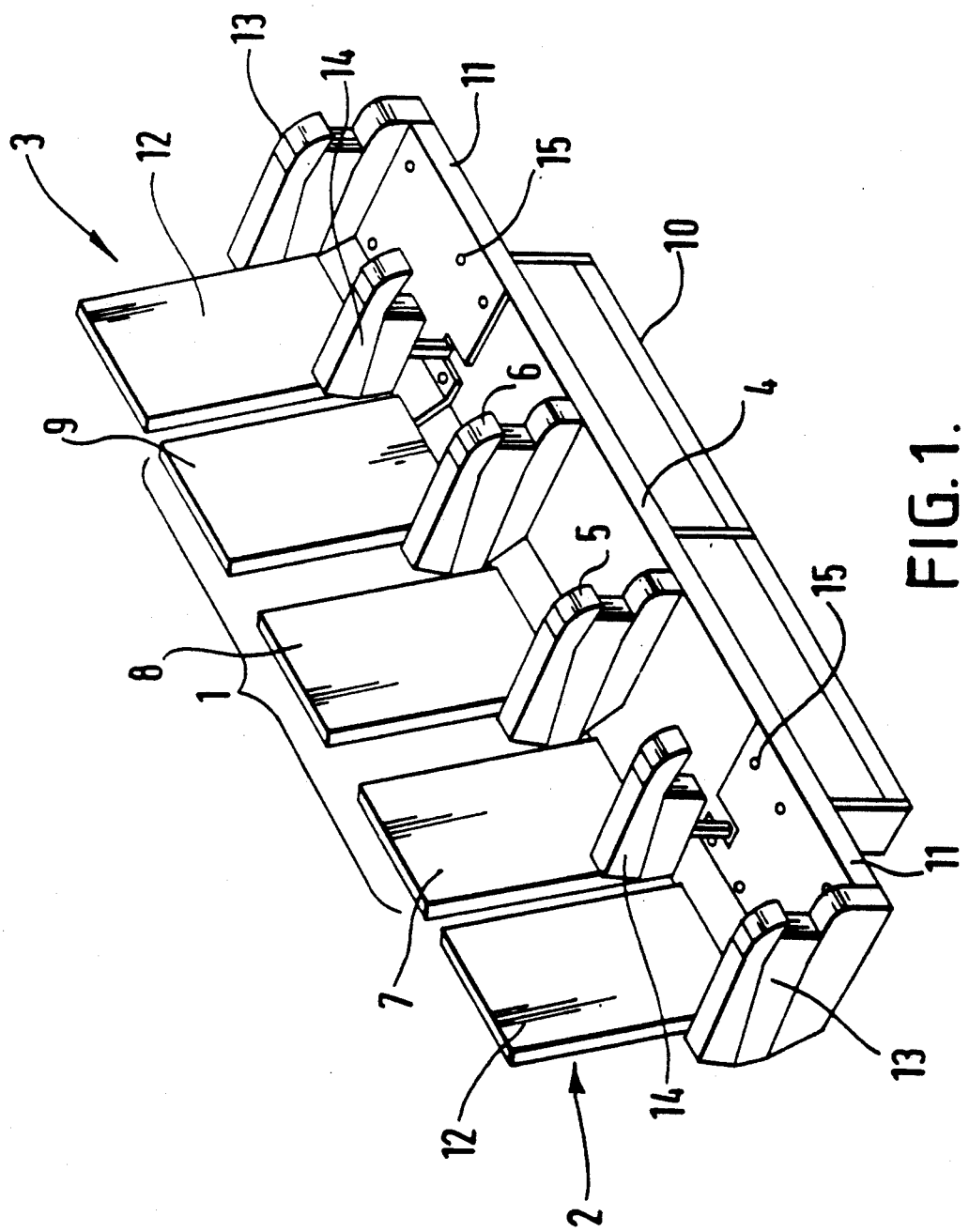
FIG. 1 is a perspective view of a convertible aircraft seat arranged to seat economy class passengers.
Figure 2:
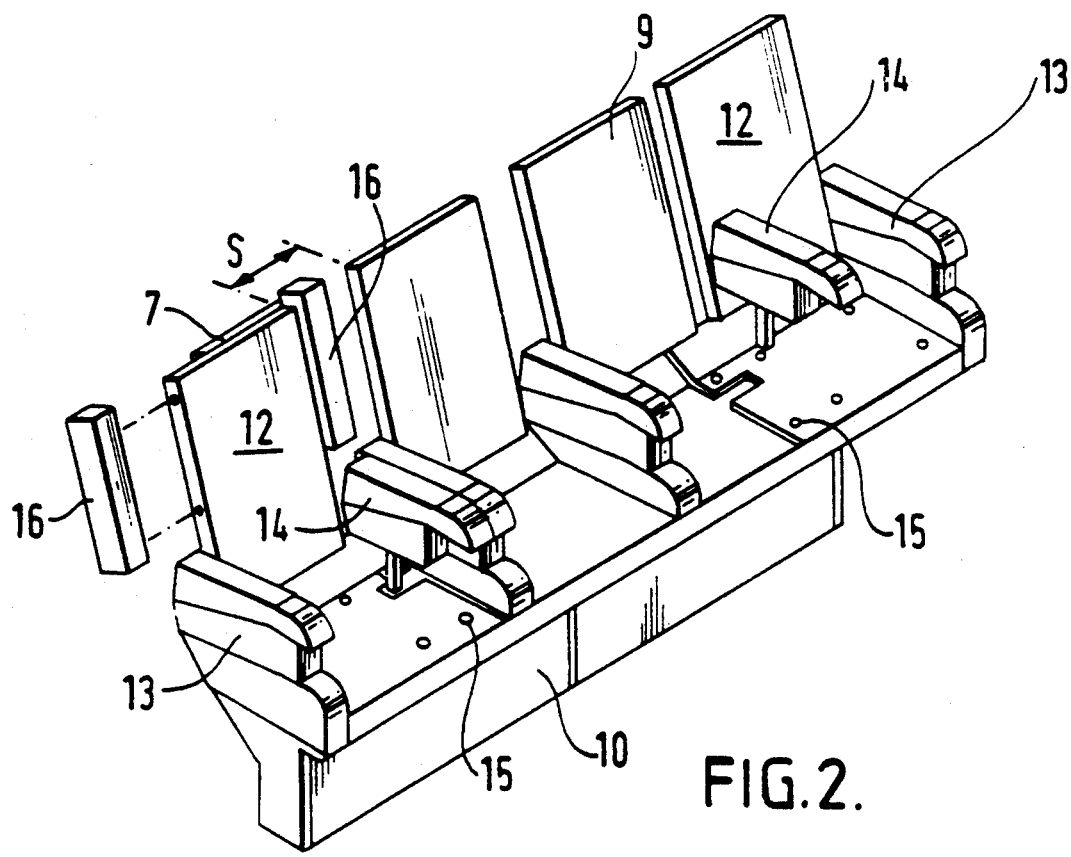
FIG. 2 is a perspective view of the seat of FIG. 1 illustrating an intermediate position as between economy class configuration and business class configuration.
Figure 3:
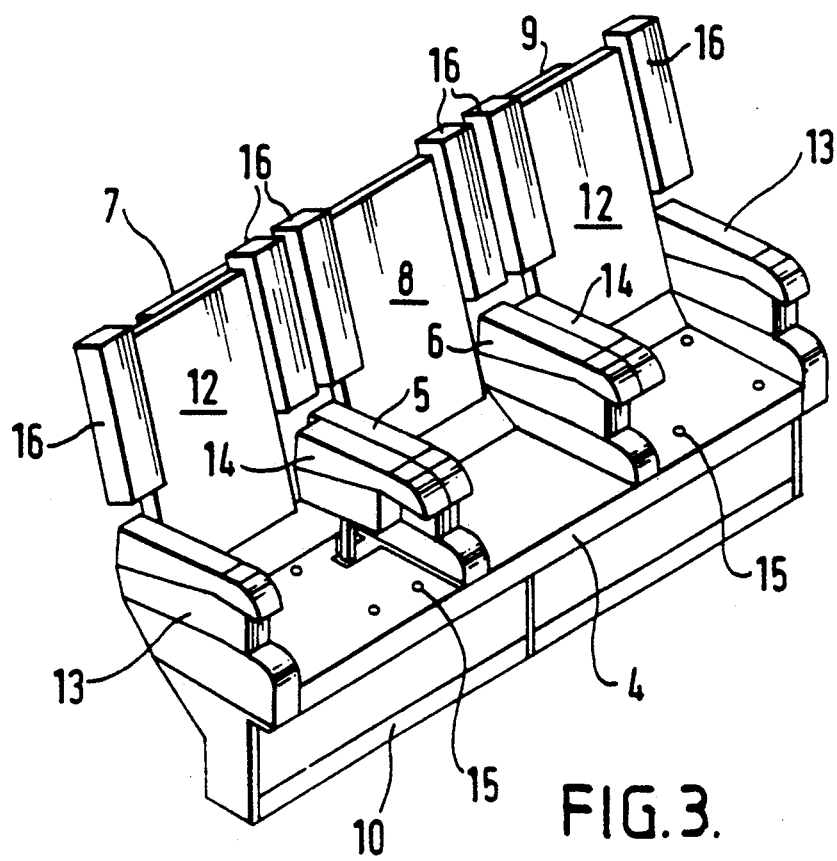
FIG. 3 is a perspective view of the seat of FIG. 1 fully converted to business class passenger usage.

The aircraft seat shown in FIGS. 1 to 3 of the drawings comprises a main seat section 1 providing three passenger seats and two outer extendible seat sections 2 and 3 each providing an additional passenger seat.

With particular reference to FIG. 1, wherein the seat is shown fully extended for economy class use, the main seat section 1 comprises a base frame 4 provided with fixed arms 5 and 6 between the upright seat backs 7, 8, 9, attached to the frame 4.

The frame 4 of the main seat section 1 is mounted on a box structure 10 which itself is affixable to the floor of an aircraft cabin via seat tracks (not shown).

The extendible seat sections 2 and 3 each comprise a main support frame 11 to which is attached an upright seat back 12 and an outer fixed arm 13. A detachable arm divider 14 is provided between each extendible seat sections 2 and 3 and the adjacent fixed seat as shown.

The support frames 11 of the extendible seat sections 2 and 3 are each slidable on the base frame 4 of the main seat section 1 and are provided with a locking mechanism 15 which clamps to the base frame 4 of the main seat section 1 in extended and retracted positions respectively.

To convert the economy class configuration of the seat shown in FIG. 1 of the drawings to business class usage shown in FIG. 3, the movable arm dividers 14 are detached, the locking mechanism 15 released and the seat sections 2 and 3 moved on guides (not shown) such that the seat backs 12 of the extendible seat sections 2 and 3, overlap the seat backs 7 and 9 of the existing outermost seats of the main seat section 1 as shown more clearly in FIG. 2, to leave a predetermined space S between the seat backs 9 and 12 thereby to provide a seat width concomitant with the requirements of business class.

The previously removed arm dividers 14 are then fixed in new positions on the base frame 4 to abut the fixed arms 5 and 6 of the main seat section 1 as shown in FIGS. 2 and 3, again to accord with the requirements of a business class seat.

To complete the conversion, bolsters 16 are attached to the vertical edges of the upright seat backs 8 and 12.

The provision for the installation of the bolster 16 is made possible by the seat construction according to the invention, and the allowance of the spacing S between the seat backs 7, 8 and 9, is an important feature of the invention because it permits, in a ready and uncomplicated fashion, a highly distinctive appearance to be imparted to the seat, when retracted, of first or business class usage.

Moreover the bolsters 16 do not appear to have been added to the seat but rather to be an integral part of the seat, so that the passenger does not feel compromised and is receiving full value for money. Conversely when the bolsters 16 are removed and the seat widened, the quality of the seat, from at least the appearance point of view, for tourist class usage, is not diminished.

It will be appreciated that all removable items which are not required in either configuration such as cushions and arm dividers and removable backs, may be stowed in the box structure 10 provided beneath the main seat section 1.

In an alternative version (not shown) the seat backs 7 and 9 may be detachably mounted to the frame 4 and stowed in box 10 when not in use.

In this arrangement the seat backs 12 are positioned in alignment with the seat back 8 and guided for movement in that aligned position on the frame 4 to their retracted positions for business class usage, when the seat backs 7 and 9 have been removed.

The design of the seat as above described provides uncompromised business class comfort and visual appearance. Moreover it is adaptable to an almost limitless variety of cabin configuration for example as follows:

| Aircraft Type | Economy | Business |
| --- | --- | --- |
| B747 | 3-4-3 | 2-3-2 |
| B747 | 3-3-3 | 2-2-2 |
| DC10/MD11 | 2-5-2 | 2-3-2 |
| B767 | 2-3-2 | 2-2-2 |
| A340 | 3-3-3 | 2-3-2 |
| A340 | 2-4-2 | 2-3-2 |

Another embodiment of the invention is shown in FIG. 4.

The convertible aircraft seat shown in this variant comprises a seat support frame (not shown), mountable to the seat tracks of an aircraft cabin.

Two seat sections 16 and 17 are slidably mounted to the support frame to provide a convertible configuration as between a four seat economy version and a three seat business class arrangement as shown respectively in FIGS. 4a and 4b.

Each seat section 16 and 17 may be clamped by means (not shown) to the seat support frame in either configuration.

Each seat section 16 and 17 comprises four seat back uprights 18 separated by movable arm dividers 19 attached to the seat support frame, and two outer fixed arm dividers 20.

In FIG. 4a the middle two uprights 18' form the seat backs for the two centre economy seats. Each upright 18' has a reduced thickness portion 18" along its length, one along a rear length R and the other along a front length L as shown.

The uprights 18 are positioned in alignment along the sliding mechanism (not shown) of the support frame.

Hence to convert the economy class configuration of the convertible seat shown in FIG. 4a to the business class configuration shown in FIG. 4b, the dividers 19 are removed and the seat sections 16 and 17 are released from the frame support and slid therealong to a position shown in FIG. 4b thereby to reduce the overall width of the seat whereat the two complementary portions 18" overlap such that the middle two uprights 18' form the seat back of the middle seat of the business class configuration.

Business class arm dividers 21 are then inserted in the seat support frame at selected positions to provide the required width of the normal class business seat, and wider than the seats of economy class configuration shown in FIG. 4a.

The seats are provided with cushions and bolsters, the cushions being of differing sizes to suit, the bolsters and the cushions not being used in either configuration being stored in a box structure formed beneath the support frame, and similar to the box structure 10 of the FIG. 1 through 3 embodiment.

With the seat construction as above described the following conversions are possible:

| Business Class | | Tourist Class |
|---|---|---|
| 2 | to | 2 |
| 2 | to | 3 |
| 3 | to | 4 |
| 3 | to | 5 |

We claim:

1. A convertible aircraft seat comprising,
    a seat support frame for anchoring to the floor of an aircraft cabin,
    a main seat section mounted on said seat support frame,
    said main seat section including a preselected number of sitting positions,
    at least one slidable seat section extending outwardly from said main seat section,
    said slidable seat section being movable relative to said main seat section between an expanded position and a contracted position,
    said slidable seat section including a sitting position located adjacent to a sitting position of said main seat section,
    means for moving said slidable seat section onto said seat support frame from said expanded position to said contracted position to combine said sitting position of said slidable seat section with said adjacent sitting position of said main seat section to reduce the total number of sitting positions and form a combined sitting position having a width greater than the width of said adjacent sitting position of said main seat section,
    retaining means for holding each seat section in said positions, and
    divider means for attachment to said seat support frame at selected intervals corresponding to the number of sitting positions.

2. A convertible aircraft seat as claimed in claim 1 wherein,
    said slidable seat section includes a single sitting position, and
    means for permitting said slidable seat section forming said single sitting position to combine with said adjacent sitting position of said main seat section to form a single sitting position of greater width than the width of said adjacent sitting position to be formed between said divider means.

3. A convertible aircraft seat as claimed in claim 1 which includes,
    a seat back for said sitting position of said slidable seat section,
    a seat back for said adjacent sitting position of said main seat section,
    said means for moving said slidable seat section includes guide means on said seat support frame for guiding said seat back of said slidable seat section into overlapping relation with said seat back of said adjacent sitting position on said main seat section whereby said overlapping seat backs form the back of the combined sitting position of greater width.

4. A convertible aircraft seat as claimed in claim 3 wherein,
    said seat back of said slidable seat section moves in front of said seat back of said main seat section to take its place and form a seat back of said combined sitting position of greater width.

5. A convertible aircraft seat as claimed in claims 3 or 4 which includes,
    means for fixing positions on said seat support frame by selectively positioning said divider means including movable arm rests to delimit the combined sitting position of said slidable seat section and said main seat section.

6. A convertible aircraft seat as claimed in claim 5 wherein,
    said combined sitting position is fixed on said seat support frame and delimited by said divider means including two arm rests, and
    means provided to either side of said divider means for receiving said arm rests being initially positioned between said adjacent sitting position and said slidable sitting position before combination thereof.

7. A convertible aircraft seat as claimed in claim 1 wherein,
    said slidable seat section includes a pair of slidable sections each including two sitting positions to form a total of four sitting positions in said expanded position of said slidable seat section on said seat support frame,
    said four sitting positions including two center seats and two outer seats on opposite sides of said center seats, said center seats having seat backs with complementary portions for converting said two center seats to a single center seat upon movement of said slidable seat section from said expanded position to said contracted position where said seat backs of said center seats overlap to form said single center seat between said two outer seats for three sitting positions,
    each of said single center seat and said two outer seats in said contracted position having a width greater than each of said two center seats and said two outer seats in said expanded position,
    positioning means for positioning said divider means including arm rests between the four sitting positions in said expanded position and between the three sitting positions in said contracted position, and
    said positioning means including means for fixing to either side of said single center seat a pair of abutting arm rests.

8. A convertible aircraft seat as claimed in claim 1 including,
    seat backs of said combined sitting positions of greater width, and
    seat bolsters for removable attachment to said seat backs of said combined sitting positions of greater width.

9. A convertible aircraft seat as claimed in claim 1 including,
    storage means attached to and beneath said seat support frame for storing removable items including arm dividers, seat backs and seat bolsters when not in use on said main seat section and said slidable seat section.

* * * * *